United States Patent [19]
Risse et al.

[11] Patent Number: 5,540,760
[45] Date of Patent: Jul. 30, 1996

[54] SCRUBBER AND PROCESS FOR FLUE-GAS DESULFURIZING

[75] Inventors: Theo Risse, Werne; Günther Giepen; Matthias Kleeberg, both of Mülheim; Hildemar Böhm, Gladbeck, all of Germany

[73] Assignee: Gottfried Bischoff & Co. KG, Essen, Germany

[21] Appl. No.: 337,689

[22] Filed: Nov. 9, 1994

[30] Foreign Application Priority Data

Nov. 10, 1993 [DE] Germany ............................ 43 38 332.7

[51] Int. Cl.$^6$ ............................ B01D 21/01; B01D 47/06
[52] U.S. Cl. ............................ 95/195; 55/228; 55/229; 95/197
[58] Field of Search ............... 95/195, 197; 422/168, 422/231, 234; 55/228, 229; 423/242.1, 243.01, 243.11; 210/723

[56] References Cited

U.S. PATENT DOCUMENTS

| | | | |
|---|---|---|---|
| 4,047,891 | 9/1977 | Schuetz | 73/32 R X |
| 4,305,909 | 12/1981 | Willett et al. | 55/228 X |
| 4,337,069 | 6/1982 | German, Jr. et al. | 55/229 |
| 4,364,910 | 12/1982 | Willett et al. | 423/243.01 |
| 4,375,450 | 3/1983 | Katagiri et al. | 55/228 X |
| 4,389,351 | 6/1983 | O'Brien | 55/228 X |
| 4,515,754 | 5/1985 | Stehning | 55/228 X |
| 4,696,254 | 9/1987 | Spindler | 55/228 X |
| 4,913,819 | 4/1990 | Patterson | 210/523 |
| 5,246,594 | 9/1993 | Stegemann et al. | 55/228 X |
| 5,308,509 | 5/1994 | Bhat et al. | 95/195 X |

FOREIGN PATENT DOCUMENTS

| | | |
|---|---|---|
| 2829077 | 1/1980 | Germany . |
| 3227187 | 10/1983 | Germany . |
| 3227187C1 | 10/1983 | Germany . |
| 3613110 | 10/1987 | Germany ........................ 55/228 |
| 3227187C2 | 12/1988 | Germany . |
| WO81/00843 | 4/1981 | WIPO . |

OTHER PUBLICATIONS

FGD Report "The big clean-up" Engineering Dec. 1988.

Primary Examiner—Richard L. Chiesa
Attorney, Agent, or Firm—Herbert Dubno

[57] ABSTRACT

A scrubbing tower and process for flue-gas desulfurization uses a device for introducing additives like lime and limestone to the reaction zone of the scrubber by feeding those additives to a recirculating system recirculating the liquid through the sump. The recirculating system can also be used to withdraw the suspension from the column whose sump is cylindrical with a flat bottom. Recirculated liquid is introduced close to this bottom by the recirculating pump.

12 Claims, 4 Drawing Sheets

5,540,760

SCRUBBER AND PROCESS FOR FLUE-GAS DESULFURIZING

FIELD OF THE INVENTION

Our present invention relates to a scrubbing tower or column for flue-gas desulfurizing units and, more particularly, to a tower-type scrubber in which the flue gas traverses an absorption zone in which it is contacted with a scrubbing liquid and the scrubbing liquid is collected in a sump in which with oxidation and reaction with lime, limestone or the like, a suspension is formed in which the solids are predominantly calcium sulfate which can be recovered. The inventory also relates to a process for flue-gas desulfurizing using an improved apparatus.

BACKGROUND OF THE INVENTION

In German Patent Document De 32 27 187 C2, a scrubber for the purposes described is disclosed in which the sump collecting the scrubbing liquid from the absorption zone has a conical configuration to avoid calcium sulfate deposits during the operation of the scrubber. A circulation unit is connected to the sump having an intake at an upper location of the sump, a pump and outlet means formed in a lower part of the sump. Before the scrubber is brought into operation after a standstill the circulation unit is turned on for a short time to dissolve deposits which have collected in the apex of the cone during the standstill mode of the scrubber. When the scrubber is in operation and thus in a stationary state, the circulation unit is shut down and thus is not effective.

In practice it is found that the conical part of the sump, which provides the reaction zone, must have a significant height in order to achieve internal mixing and forming of calcium sulfate. With a substantial height of the sump, however, the overall height of the column or tower may be so great that structural problems can result. For example, the tower may have to be reinforced to withstand the higher wind forces to which the tower may be subject because of the greater height necessitated by the sump.

OBJECTS OF THE INVENTION

It is, therefore, the principal object of the present invention to provide an improved scrubbing tower, especially for the scrubbing of flue gases as part of a flue-gas desulfurization plant or unit, whereby drawbacks of earlier systems are avoided and, especially without excessive tower height, effective sump mixing and internal circulation can be achieved.

Another object of the invention is to provide a scrubber with improved effectiveness of the reaction and oxidation zones in the sump, which will allow shutdown of the gas scrubbing operation without problems and, in general, will avoid drawbacks of earlier systems.

It is also an object of the invention to provide an improved method of operating a scrubber so that the operating effectiveness is increased.

SUMMARY OF THE INVENTION

The invention is intended to apply to scrubbers for flue-gas desulfurization which have at an upper portion of the generally cylindrical tower, an absorption zone provided with a gas inlet and a gas outlet and thus is traversed by the flue gas. Means, e.g. spray heads, can be provided in the absorption zone for effecting intimate contact between a scrubbing liquid sprayed into the zone through these heads and the flue gas traversing the zone.

Below this absorption zone is the sump in which the liquid from the absorption zone collects. The sump is provided with a horizontal grate of oxygen feed ducts which define, above this grate, an oxidation zone and below the grate, a reaction zone.

In the reaction zone below the grate, additives like lime, limestone and the like react with the scrubbing liquid to produce calcium sulfate which forms a suspension in the scrubbing liquid in the sump or at least constitutes the predominant portion of the solids of that suspension. Means is provided to draw scrubbing liquid from the sump and feed it to the spray heads.

From time to time or continuously, the suspension is removed, e.g. to be dewatered and enable the production of plaster or gypsum therefrom.

According to the present invention, the sump is cylindrical and is provided with a flat bottom. Furthermore recirculating means is provided to draw a liquid or suspension from the sump and return it to the sump for mixing of the sump contents. The recirculation means includes an intake duct, a pump and a discharge duct, the two ducts communicating with the sump. The intake communicates with the sump at an upper location thereof. The discharge duct comprises a multiplicity of outlet located proximal to the flat bottom. The recirculation means operates in a stationary state of the scrubber, i.e. a state of the tower in which the tower is in use for gas scrubbing. The means for feeding the additives to the sump is constituted by means feeding those additives into the recirculating system so that the additives are mixed with the recirculated liquid before it is returned to the sump close to the flat bottom.

The recirculating means according to the invention operates continuously, i.e. both during gas scrubbing and upon shutdown of gas scrubbing and thus the recirculating means has a plurality of functions. For one thing, it limits the deposits of sediments in the sump.

The liquid stream which is recirculated to the sump in the region of the bottom can also generate flow conditions in the reaction zone which leads to an improvement in the material exchange in the reaction zone.

Finally, the recirculated liquid entering close to the bottom of the sump serves as a carrier for the additives (for example lime, limestone and other additives) used in the desulfurization by scrubbing of flue gases and which are uniformly dispersed within the sump by reason of the flow of the recirculated liquid from the bottom upwardly.

According to a feature of the invention, the recirculating outlets in the region of the bottom of the sump are distributed around the shell of the tower and open partly tangentially and partially radially into the sump. In another embodiment of the invention, the outlets of the recirculating liquid are distributed uniformly in the region of the bottom over the area thereof, with the outlet ends being directed toward the flat bottom and being vertical and perpendicular to the flat bottom.

The outlet ends can be shaped like nozzles with orifices opening in the direction of the flat bottom, the spacing of the outlet end from the flat bottom being substantially 10 to 30 times the diameter of the orifices as they open into the sump. The unit should be operated so that the total volume rate of the flow per area of the flat bottom has a value of say 5 to 15 $m^3/(m^2 h)$.

The apparatus thus gives rise to very uniform reaction conditions in the reaction zone. The use of a scrubber sump with a flat bottom in combination with the other features described gives rise to a significant reduction in the required height of the tower by comparison with the prior art system previously described.

It has been found to be advantageous to connect a suspension discharge duct to the pressure side of the pump and to use the pump for discharge of the suspension. In this case, the duct can communicate with a dewatering unit and will be provided with a control valve. The latter allows a suspension of calcium sulfate to be periodically or continuously discharged.

The recirculating pump thus can be used for discharge of the calcium sulfate suspension and for gypsum recovery. Expensive auxiliary systems for this purpose can be eliminated. The device for feeding the additives to the sump can also be connected to the pressure side of the pump and downstream of the suspension withdrawal line to avoid discharge losses with the gypsum withdrawn.

The suction line or intake of the recirculating system is connected to an upper portion of the sump. It may be connected in the region of the oxidation zone of the sump. Preferably, however, it is provided at a small distance below the grate. The recirculator thus has its suction and pressure side connected to the reaction zone which ensures an especially intensive circulation in the reaction zone.

Filling and emptying ducts can be provided for the filling or emptying of the sump and can be connected to a collecting vessel which can retain residual sump liquid. Advantageously, the filling line is connected to the suction side of the pump and the emptying line with the pressure side of the pump at the recirculating unit. With the aid of the pump for the recirculating unit, scrubbing liquid can be emptied from the sump when the column or tower is taken out of operation and later refilled using the pump. The filling and emptying ducts will generally be provided with respective valves. Auxiliary devices for emptying and filling need not be supplied. Additional means such as sampling ducts may be connected to the pressure side of the pump which will allow measurement and control units to be connected as required.

More particularly, the scrubber of the invention can comprise:

a cylindrical tower having a flue gas inlet and a flue gas outlet;

means in the tower forming an absorption zone between the inlet and the outlet and traversed by a flue gas, the absorption zone being provided with means for treating flue gas traversing the absorption zone with a scrubbing liquid;

a cylindrical sump formed in the tower below the absorption zone and collecting scrubbing liquid from the absorption zone, the sump having a flat bottom;

a horizontal grate in the sump of oxygen inlet ducts defining an oxidation zone above the grate and a reaction zone below the grate;

means for drawing scrubbing liquid from the sump and supplying scrubbing liquid withdrawn from the sump to the means for treating the flue gas traversing the absorption zone with the scrubbing liquid;

continuously operating recirculating means including:
an intake communicating with the sump at an upper location thereof,
a pump having a suction side connected with the intake and a pressure side, and
outlet means formed in a lower portion of the sump with a multiplicity of outlets located proximal to the flat bottom for recirculating liquid withdrawn from the sump at the upper location back to the sump at the lower location both during scrubbing operation of the tower and upon standstill thereof, thereby circulating contents of the sump;

means connected with the continuously operating recirculating means for introducing additives into liquid recirculating therein and thereby into the reaction zone to produce a suspension therein of solids comprised principally of calcium sulfate; and means for discharging the suspension from the sump.

A method of operating the aforedescribed scrubber can comprise the steps of:

(a) passing a flue gas to be desulfurized from a gas inlet to a flue gas outlet through an absorption zone between the inlet and the outlet in a cylindrical tower;

(b) contacting the flue gas in the absorption zone with a scrubbing liquid;

(c) collecting in a cylindrical sump formed in the tower below the absorption zone scrubbing liquid from the absorption zone, the sump having a flat bottom;

(d) introducing oxygen into a suspension in the sump through a horizontal grate of oxygen inlet ducts defining an oxidation zone above the grate and a reaction zone below the grate;

(e) drawing scrubbing liquid from the sump and supplying scrubbing liquid withdrawn from the sump to the absorption zone;

(f) continuously recirculating liquid through the sump and mixing contents thereof by:
withdrawing liquid from the sump through an intake communicating with the sump at an upper location thereof,
pumping the liquid withdrawn from the sump with a pump having a suction side connected with the intake and a pressure side, and
forcing the liquid withdrawn from the sump back into the sump through outlet means formed in a lower portion of the sump with a multiplicity of outlets located proximal to the flat bottom for recirculating liquid withdrawn from the sump at the upper location back to the sump at the lower location both during scrubbing operation of the tower and upon standstill thereof;

(g) introducing additives into the recirculated liquid withdrawn from the upper location prior to return of the withdrawn liquid through the outlets for reaction of the additives with the suspension in the reaction zone to form solids comprised principally of calcium sulfate therein; and (h) discharging the suspension from the sump.

BRIEF DESCRIPTION OF THE DRAWING

The above and other objects, features, and advantages will become more readily apparent from the following description, reference being made to the accompanying drawing in which.

DESCRIPTION OF THE PREFERRED EMBODIMENTS

Figure 1:
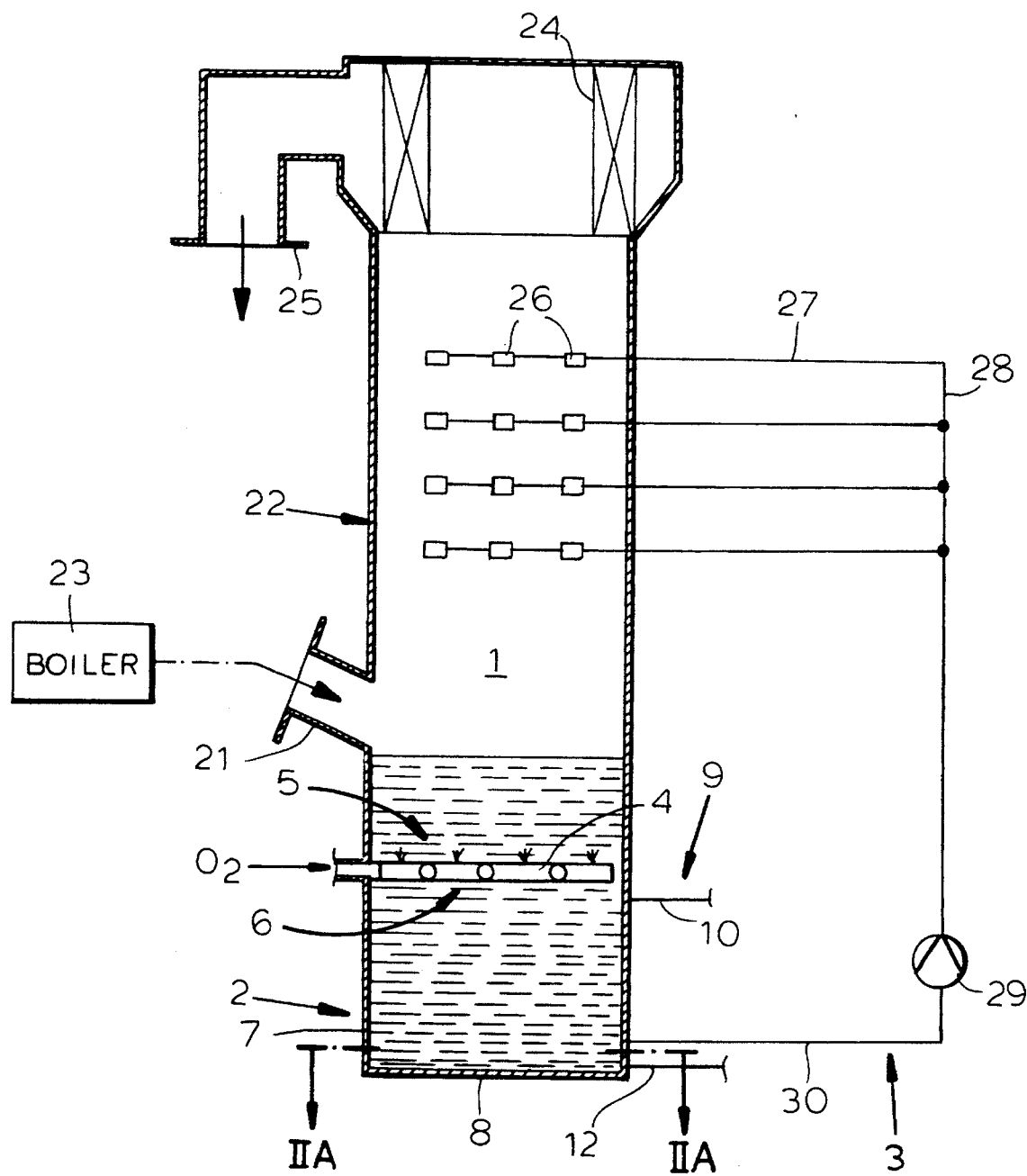
FIG. 1 is a vertical section through a column according to the invention.

The scrubber shown in the drawing can be considered to be part of an apparatus or plant for flue-gas desulfurization, the inlet 21 of the upright column 22 being connected as shown to a boiler combustion chamber represented at 23. The upper part of the generally cylindrical column forms an absorption zone 1 and, at the head of the column, a droplet separator 24 is provided upstream of the scrubbed gas outlet 25.

Within the absorption zone, a multiplicity of spray heads 26 can be provided and can be connected to respective supply ducts 27 of a manifold 28, receiving the recirculated scrubbing liquid from a pump 29 whose intake side is connected at 30 to a sump 2 formed beneath the absorption zone 1. The entire system for supplying the scrubber heads 26 with the scrubbing liquid is represented at 3.

As can be seen from FIG. 1 as well, the sump 2 is cylindrical and has a flat bottom 8 as well as a horizontal grate 4 made up of oxygen inlet ducts and defining above this grate an oxidation zone 5 and below this grate a reaction zone 6.

In the manner described heretofore, additives like lime, limestone and the like can be supplied to the suspension in the sump and react with the suspension in the reaction zone with the formation of calcium sulfate.

A recirculating system represented generally at 9 is provided to induce mixing in at least the reaction zone of the sump and can comprise an intake or suction line 10 connected at an upper location of the sump, preferably slightly below the grate 4, and a multiplicity of backflow outlet ducts with respective outlets 12 extending into the sump and lying just above the flat bottom 12. It is also possible to provide the intake line 10 so that it communicates with the sump above the grate 4, i.e. in the oxidation zone.

Figure 1A:
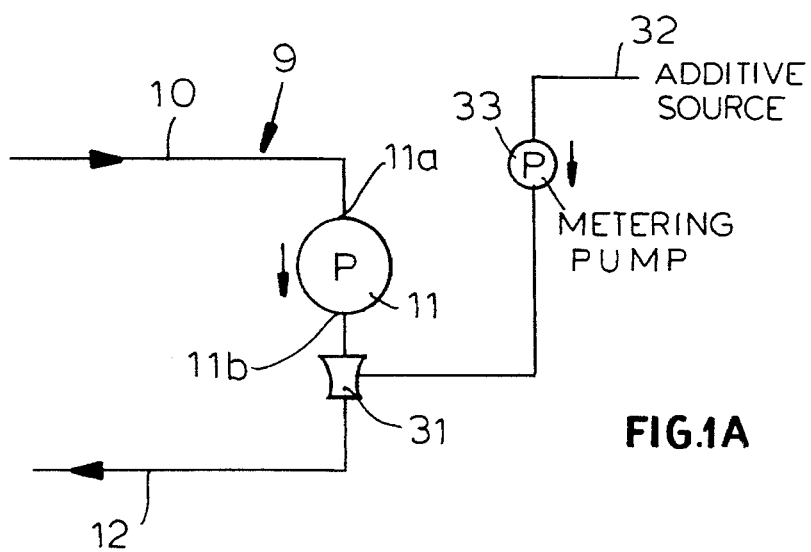
FIG. 1A is a diagram of a portion of the recirculating system in FIG. 1.

A device 13 (FIG. 2) is provided for introducing the additives like lime and limestone to the recirculating unit 9. The additives are entrained by the recycled liquid to the outlet ducts 12 into the sump close to the bottom 8 and these outlets can be uniformly distributed around the periphery of the shell 7 of the sump or across the bottom 8. The additives react quickly with the liquid in the reaction zone 6. As can be seen from FIG. 1A, the recirculating system 9 can comprise a pump 11, to whose suction side 11a, the intake line 10 is connected and at whose discharge side 11b, the outlet ducts 12 are connected. At the outlet side as well, a Venturi injector 31 can be provided which receives the additives in suspension in water, for example, from an additive source 32, e.g. via a metering pump 33.

Figure 2:
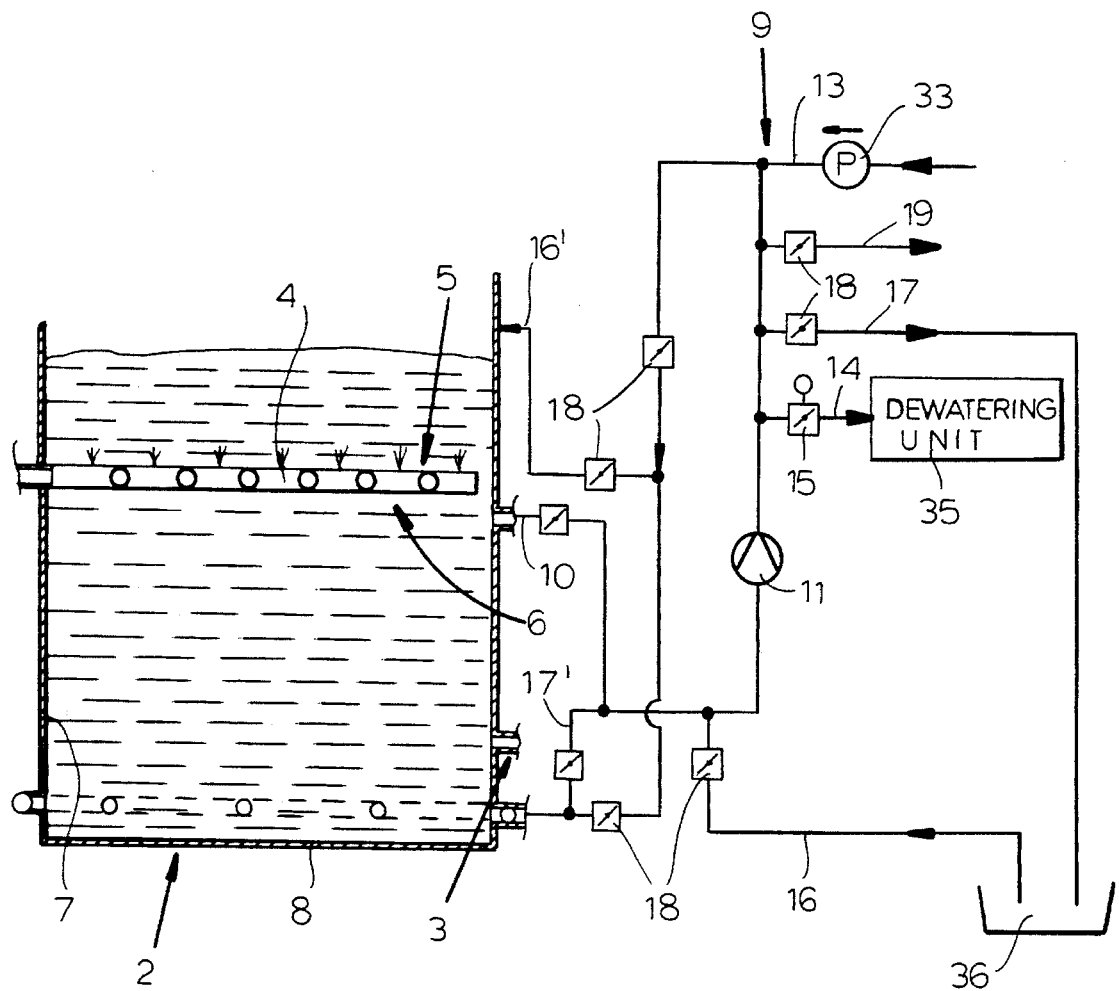
FIG. 2 is a section through the sump portion of a scrubbing tower, e.g. that of FIG. 1, showing another arrangement of the circulating system.
Figure 2A:
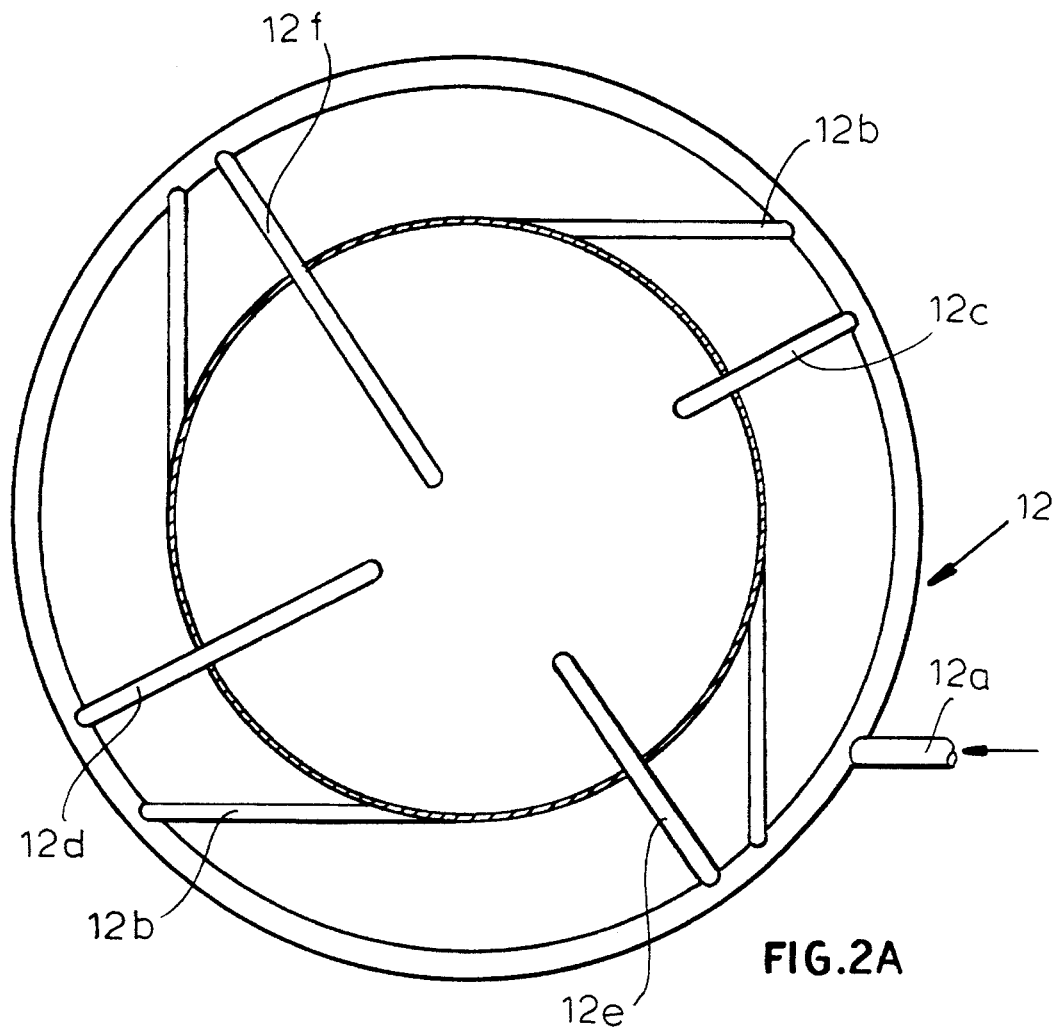
FIG. 2A is a section taken along the line IIA—IIA of FIG. 1.

From FIG. 2A it will be apparent that the outlet line system 12 may comprise a line 12a connected to the Venturi 31, a plurality of lines 12b opening tangentially into the sump 2 and a plurality of lines 12c, 12d, 12e and 12f opening radially into the sump 2.

As will also be apparent from FIG. 2, the line 13 is connected to the recirculating system 9 at the pressure side of the pump 11 and preferably downstream of the connection of a suspension discharge duct 14 thereto. The duct 14 is equipped with a control valve and is connected in turn to a dewatering unit 35. The suspension which is discharged contains solids which are predominantly calcium sulfate and the discharge is effected periodically or continuously. Plaster can be recovered from the dewatering unit.

The filling duct 16 and an emptying duct 17 can also be connected to the recirculating unit 9 for filling or emptying the scrubber sump. These ducts may be connected to a collecting basin 36. The filling duct 16 is connected at the suction side of the pump 11 via a valve 18 while the emptying duct 17 is connected to the pressure side of the pump 11, also via a valve 18. Filling can be effected through a line 16' opening into the scrubber above the sump 2 while discharge is effected through a line 17' opening into the sump close to the bottom and both via valves 18.

All of the aforementioned lines are provided with shut-off valves 18 which are closed during stationary operation of the tower.

Also connected to the pressure side of the pump 11 is a sampling line 19, also via a shut-off valve 18 and which may be connected to an analysis unit for, for example, pH measurement.

Figure 3:
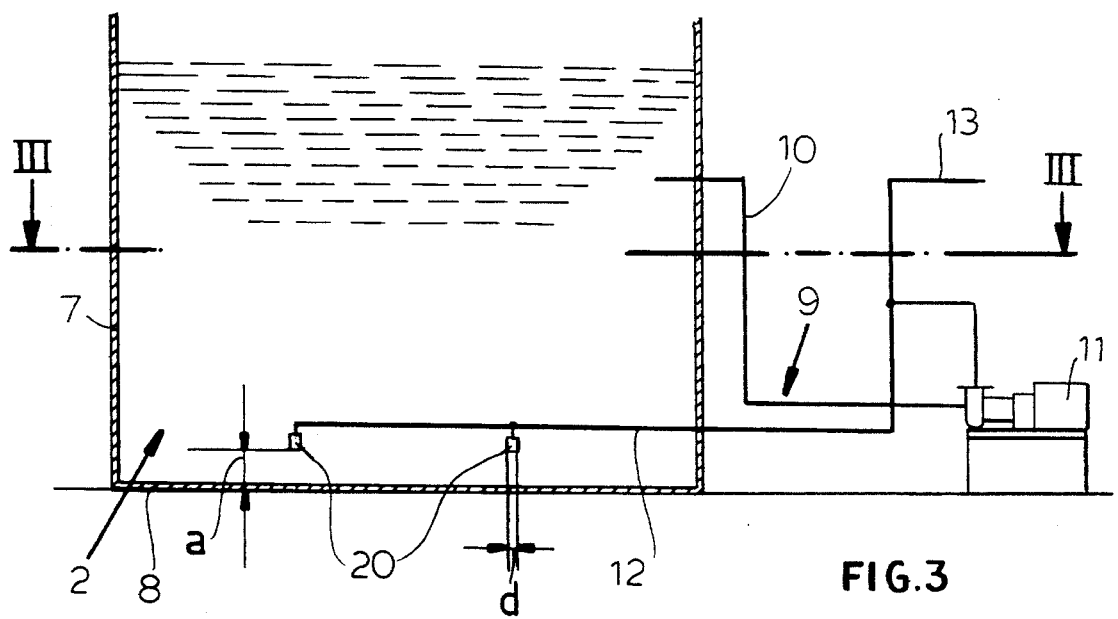
FIG. 3 is a vertical section through another embodiment of a scrubber, showing only the lower portion.
Figure 4:
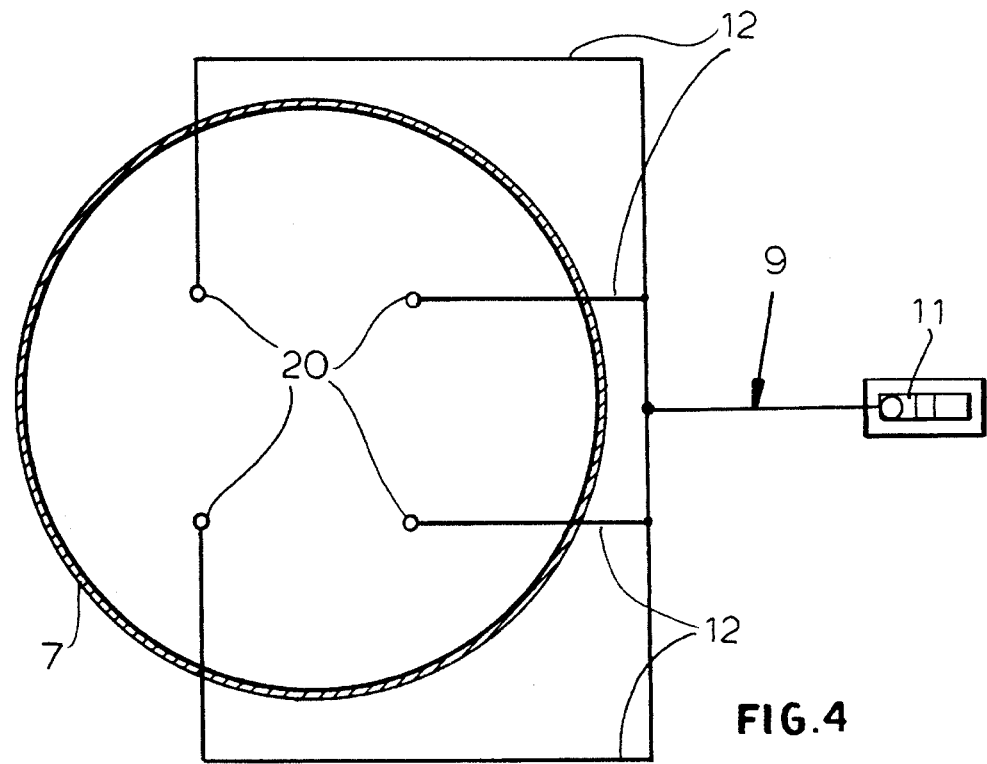
FIG. 4 is a section taken along the line IV—IV of FIG. 3.

In the structure illustrated in FIG. 2, the outlet lines 12 are distributed uniformly over the bottom 8 of the sump all around the shell 7. In the embodiment of FIGS. 3 and 4, the outlets are uniformly distributed at 20 over the area of the bottom with the ends of these outlets extending vertically and being open toward the bottom 8. The spacing a of the ends 20 with the respective orifices can be 10 to 30 times the diameter of the orifice as represented diagrammatically at d. The total volume rate of flow per unit area of the flat bottom can be 5 to 15 $m^3/(m^2h)$. The sump of FIG. 3 also has the oxygen feed-grate 4 as previously described.

We claim:

1. A scrubber for a flue-gas desulfurizing plant, comprising:

a cylindrical tower having a flue gas inlet and a flue gas outlet;

means in said tower forming an absorption zone between said inlet and said outlet and traversed by a flue gas, said absorption zone being provided with means for treating flue gas traversing said absorption zone with a scrubbing liquid;

a cylindrical sump formed in said tower below said absorption zone and collecting scrubbing liquid from said absorption zone, said sump having a flat bottom;

a horizontal grate in said sump of oxygen inlet ducts defining an oxidation zone above said grate and a reaction zone below said grate;

means for drawing scrubbing liquid from said sump and supplying scrubbing liquid withdrawn from said sump to said means for treating the flue gas traversing said absorption zone with the scrubbing liquid;

recirculating means operating continuously during scrubbing operation of the tower and including:

a suction line intake communicating with said sump at an upper location thereof slightly below said grate, a pump having a suction side connected with said intake and a pressure side, and outlet means formed in a lower portion of said sump with a multiplicity of outlets located proximal to said flat bottom for recirculating liquid withdrawn from said sump at said upper location back to said sump at said lower location both during scrubbing operation of the tower and upon standstill thereof, thereby circulating contents of said sump;

means connected with said continuously operating recirculating means for introducing additives into liquid recirculating therein and thereby into said reaction zone to produce a suspension therein of solids comprised substantially of calcium sulfate; and means for discharging said suspension from said sump.

2. The scrubber defined in claim 1 wherein said outlets are spaced apart over said flat bottom, some of said outlets opening tangentially into said sump, others of said outlets extending radially into said sump.

3. The scrubber defined in claim 1 wherein said outlets are uniformly distributed across said flat bottom and are directed toward said flat bottom.

4. The scrubber defined in claim 3 wherein said outlets are oriented vertically and have downwardly discharging orifices.

5. The scrubber defined in claim 3 wherein said orifices of said outlets open at a distance from said flat bottom which is 10 to 30 times the diameters of said orifices and the total volume flow rate relative to the area of the flat bottom is dimensioned to be 5 to 15 $m^3/(m^2h)$.

6. The scrubber defined in claim 1 wherein said means for discharging said suspension from said sump includes a duct connected to said pressure side of said pump through a control valve, said duct being connected to a dewatering unit for periodic or continuous discharge of the suspension.

7. The scrubber defined in claim 6 wherein said means connected with said continuously operating recirculating means for introducing additives into liquid recirculating therein includes an additive supply line connected to said recirculating means at said pressure side of said pump downstream of the connection of said duct of the means for discharging said suspension thereto.

8. The scrubber defined in claim 1, further comprising a collection vessel, a filling duct connected to said collection vessel and an emptying duct connected to said collection vessel, said filling duct being connected to said recirculating means at said suction side of said pump, said emptying duct being connected to said recirculating means at said pressure side of the pump.

9. A method of operating a scrubber for a flue-gas desulfurizing plant, comprising the steps of:

(a) passing a flue gas to be desulfurized from a gas inlet to a flue gas outlet through an absorption zone between said inlet and said outlet in a cylindrical tower;

(b) contacting said flue gas in said absorption zone with a scrubbing liquid;

(c) collecting in a cylindrical sump formed in said tower below said absorption zone scrubbing liquid from said absorption zone, said sump having a flat bottom;

(d) introducing oxygen into a suspension in said sump through a horizontal grate of oxygen inlet ducts defining an oxidation zone above said grate and a reaction zone below said grate;

(e) drawing scrubbing liquid from said sump and supplying scrubbing liquid withdrawn from said sump to said absorption zone;

(f) continuously recirculating liquid through said sump and mixing contents thereof during scrubbing operation of said tower by:

withdrawing liquid from said sump through a suction-line intake communicating with said sump at an upper location thereof slightly below said grate, pumping the liquid withdrawn from said sump with a pump having a suction side connected with said intake and a pressure side, and forcing the liquid withdrawn from said sump back into said sump through outlet means formed in a lower portion of said sump with a multiplicity of outlets located proximal to said flat bottom for recirculating liquid withdrawn from said sump at said upper location back to said sump at said lower location both during scrubbing operation of the tower and upon standstill thereof;

(g) introducing additives into the recirculated liquid withdrawn from said upper location prior to return of the withdrawn liquid through said outlets for reaction of said additives with said suspension in said reaction zone to form solids comprised substantially of calcium sulfate therein; and (h) discharging said suspension from said sump.

10. The method defined in claim 9 wherein the recirculated liquid is introduced into said sump through vertical outlets uniformly distributed over said flat bottom and having orifices of said outlets opening at a distance from said flat bottom which is 10 to 30 times the diameters of said orifices and with total volume flow rates relative to the area of the flat bottom of 5 to 15$m^3/(m^2h)$.

11. The method defined in claim 9 wherein the liquid recirculated to said outlets is introduced into said sump at least in part tangentially.

12. The method defined in claim 9 wherein the liquid recirculated to said outlets is introduced into said sump at least in part radially.

* * * * *